United States Patent [19]
Guibert

[11] Patent Number: 4,490,046
[45] Date of Patent: Dec. 25, 1984

[54] MULTI-STAGE AUTOMATIC DOUGH-PRODUCING SYSTEM

[76] Inventor: Raul Guibert, 10374 Summer Holly Cir., Los Angeles, Calif. 90024

[21] Appl. No.: 339,186

[22] Filed: Jan. 13, 1982

Related U.S. Application Data

[63] Continuation-in-part of Ser. No. 272,344, Jun. 10, 1981, Pat. No. 4,352,567.

[51] Int. Cl.³ .................... B29B 1/06; B01F 5/12
[52] U.S. Cl. ......................... 366/76; 366/83; 366/86; 366/91; 366/92; 366/297; 366/323
[58] Field of Search .............. 366/76, 77, 79, 83, 366/84, 86, 88, 91, 96, 97, 255, 256, 257, 285, 297, 323, 78, 92, 219, 240, 149, 169, 178, 181; 425/205

[56] References Cited

U.S. PATENT DOCUMENTS

| | | | |
|---|---|---|---|
| 1,790,347 | 1/1931 | Hawkins | 366/165 |
| 3,375,082 | 3/1968 | Graf | 366/149 |
| 3,797,808 | 3/1974 | Ma et al. | 366/78 |
| 3,977,658 | 8/1976 | Wittrock et al. | 366/86 |
| 4,134,714 | 1/1979 | Driskill | 366/83 |
| 4,249,877 | 2/1981 | Machen | 425/205 |

Primary Examiner—Billy J. Wilhite
Assistant Examiner—Michael Knick
Attorney, Agent, or Firm—Michael Ebert

[57] ABSTRACT

An automatic dough-producing system including a controllable mixing stage into which are fed flour and a dough-forming solution to produce a paste which is then supplied to a development stage yielding dough. In the development stage, the incoming paste is fed through a lateral inlet to a screw rotating within an elongated tube at a variable speed, the inlet position being adjustable along the screw to vary the length of that portion of the screw which acts to knead and develop the paste to produce the dough, this adjustment being independent of the mixing stage.

13 Claims, 6 Drawing Figures

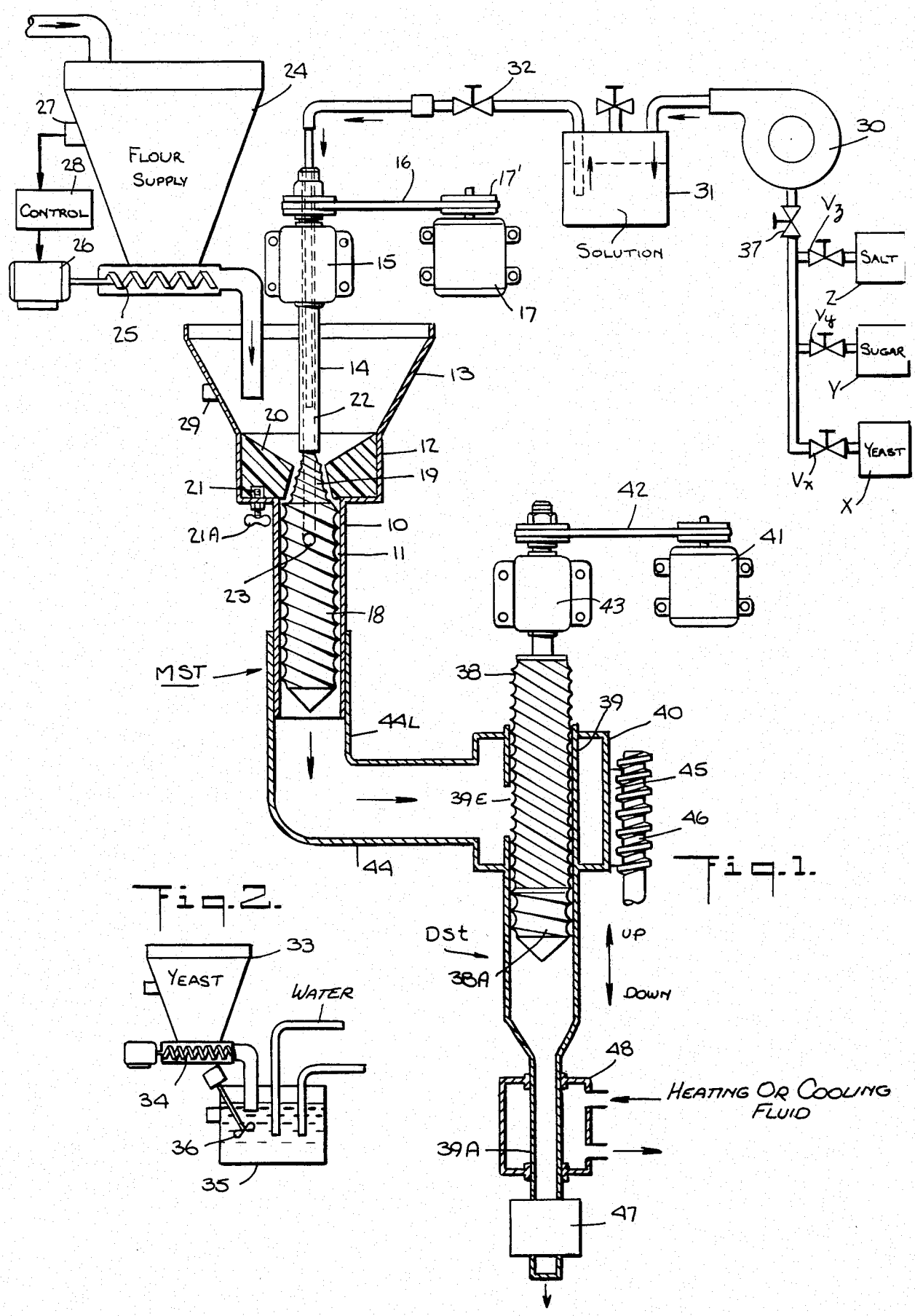

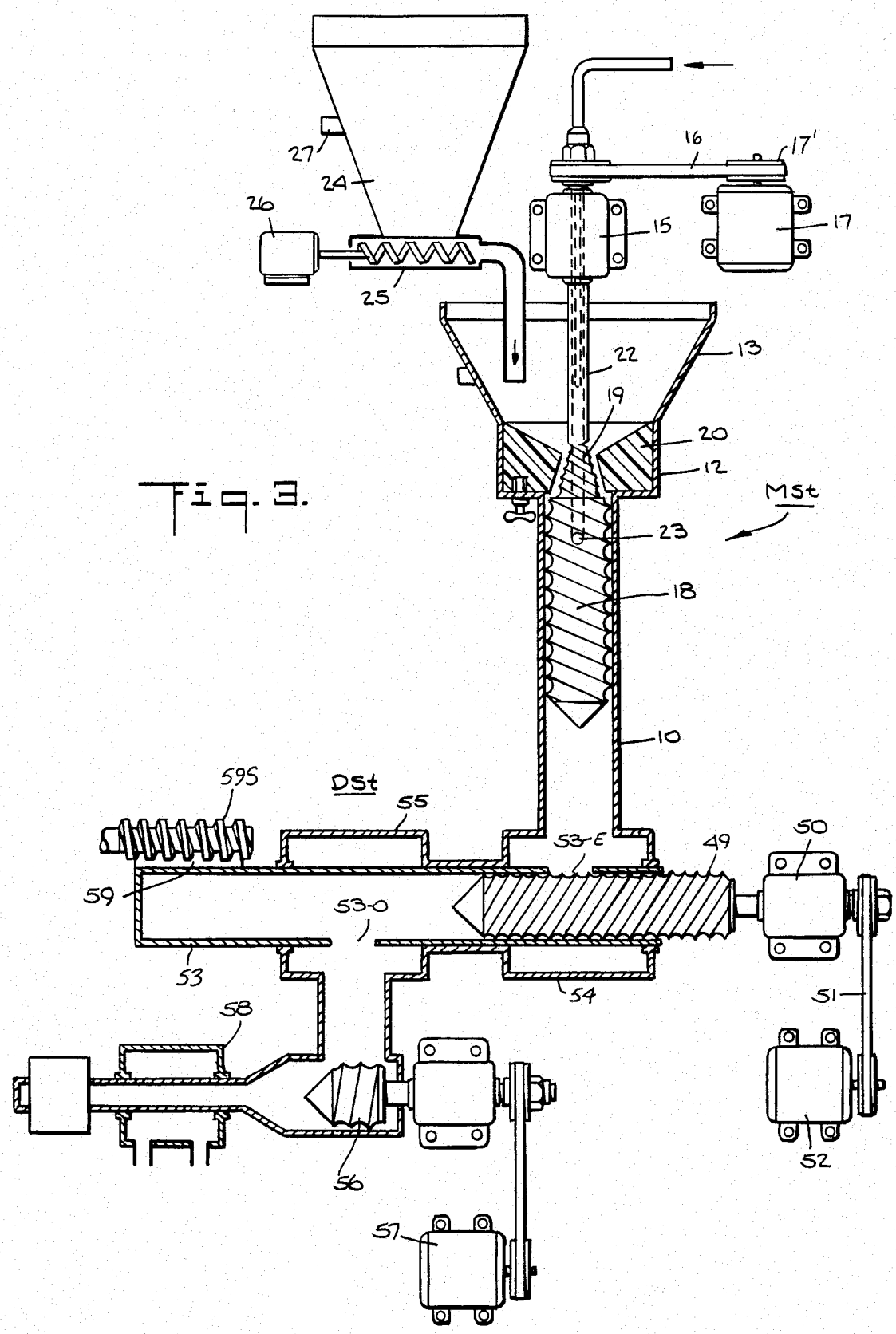

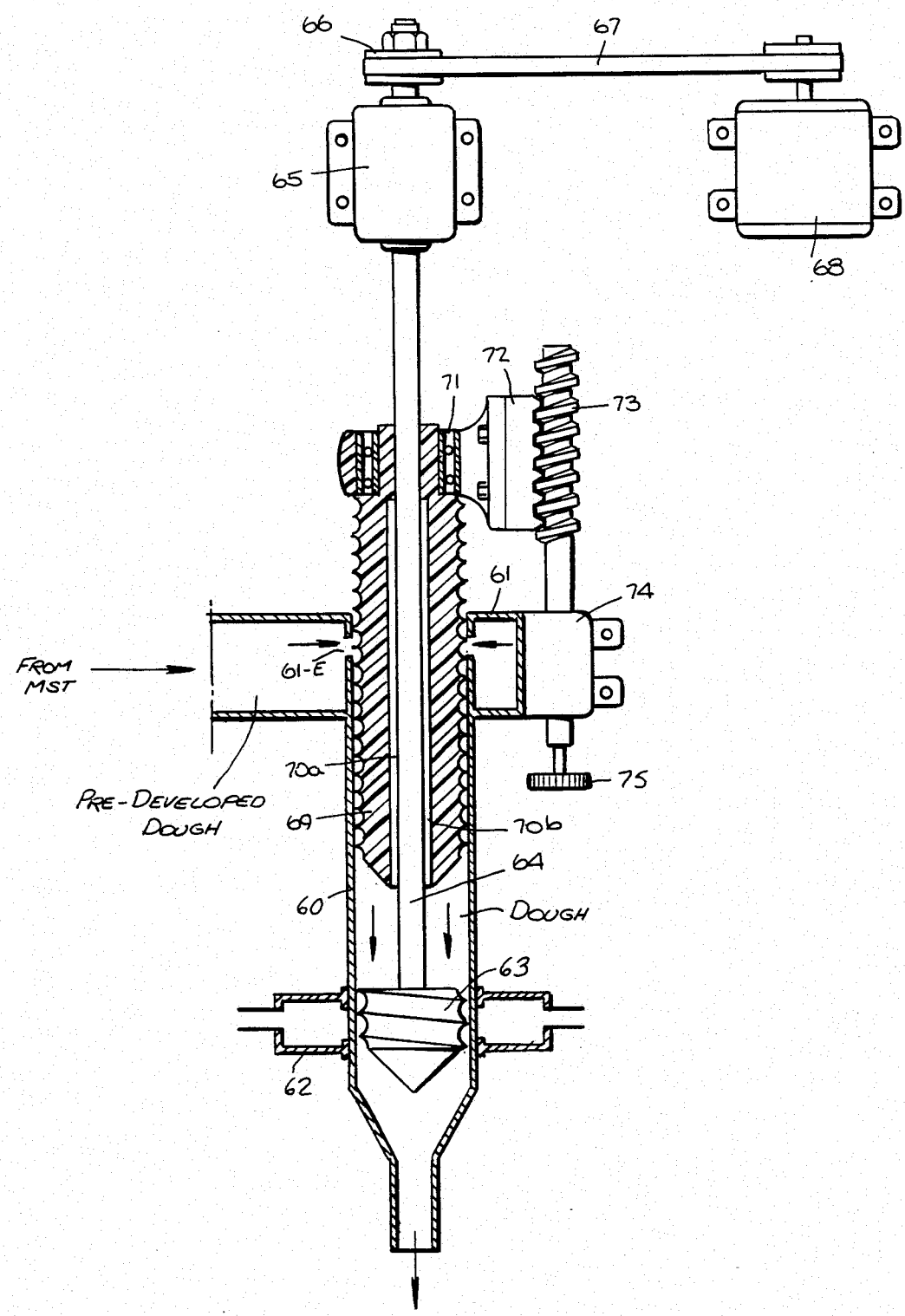

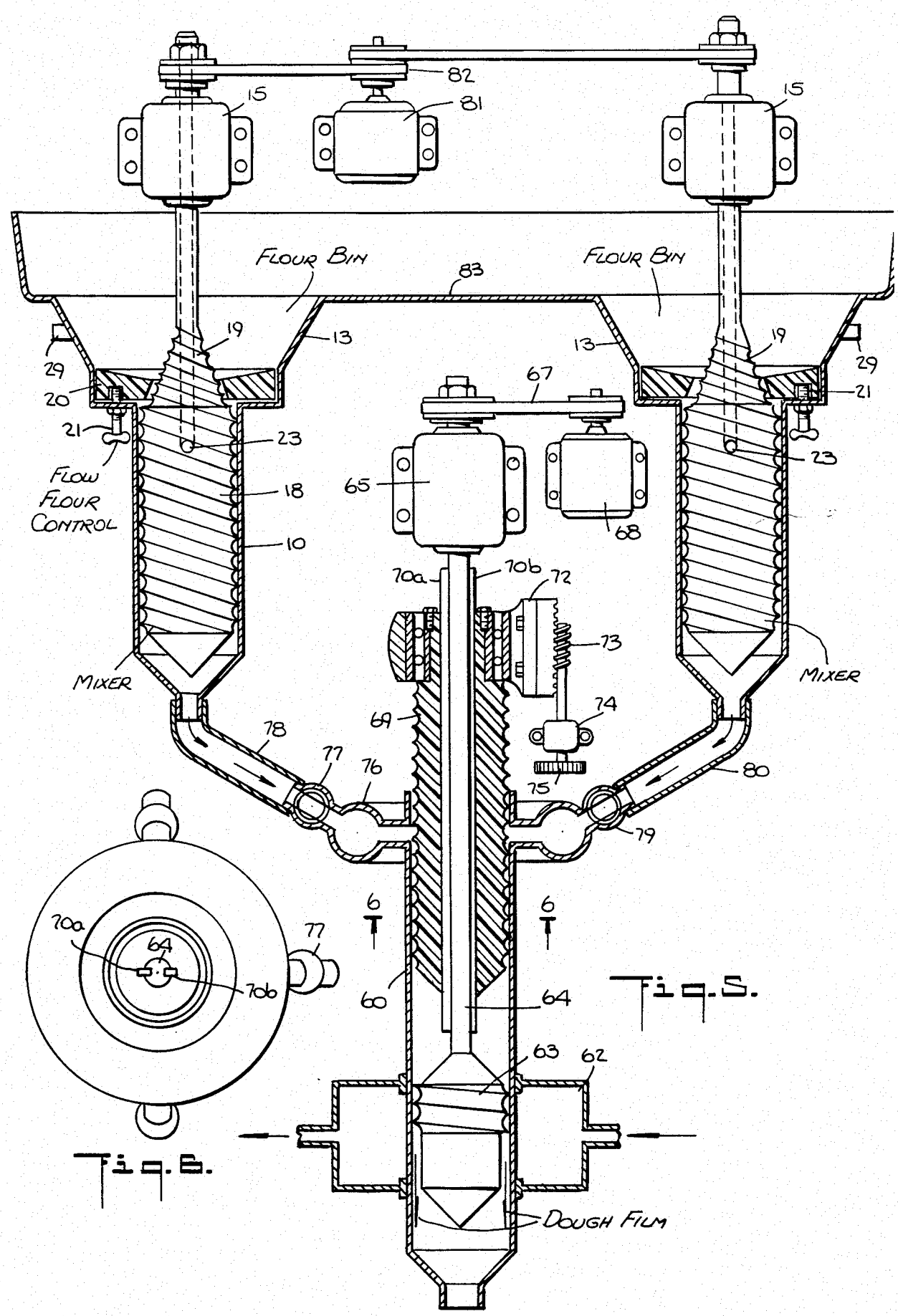

MULTI-STAGE AUTOMATIC DOUGH-PRODUCING SYSTEM

RELATED APPLICATION

This application is a continuation-in-part of my application Ser. No. 272,344, entitled "Automatic Dough-Processing Apparatus," filed June 10, 1981, now U.S. Pat. No. 4,352,567 whose entire disclosure is incorporated herein by reference.

BACKGROUND OF INVENTION

This invention relates generally to automatic dough producing systems, and more particularly to a system whose respective stages, such as those required for mixing flour and a dough-forming solution and for kneading and developing the dough, are separately controllable, making it possible to optimize the conditions prevailing in each stage.

From the standpoint of production volume, bread is the most important baked product. Mixing is the first active step in bread production. The ingredients involved in mixing are flour and a dough-forming solution constituted typically by water, yeast, sugar, salt, milk and shortening. Ideally, mixing should result in a uniform mixture forming a smooth dough; it should develop the gluten in the dough in order to promote the elasticity of the dough and permit it to retain the gases generated by the yeast; and it should distribute the yeast cells uniformly so that they will receive proper nutrition.

In traditional techniques for producing dough, such as the batch method in which heavy blades revolve in a large bowl act to mix the flour and dough-forming solution into a homogeneous mass, a number of steps must be separately performed which render the process time-consuming and costly. Moreover, the resultant dough is not entirely homogeneous, giving rise to non-uniform dough balls and a final baked product of unpredictable consistency.

The fact that dough can be rapidly produced has been confirmed by Bernadin et al. in their article "Hydrated Protein Fibrils from Wheat Endosperm" in the periodical *Cereal Chemistry*—September–October 1968, Vol. 50, No. 5. This article points out that flour hydration occurs very rapidly; for wetting a single particle of four in a droplet of water requires less than 0.05 sec. for complete hydration, a hydrated protein web spreading quickly from the particle. Adjacent flour particles spreading similar protein networks interact to form a continuous system that can be worked mechanically to form a dough-like mass.

In my prior patent, a screw rotating within a vertical tubular chamber acts to centrifugally hurl flour fed into the chamber against the inner wall thereof, thereby depositing a thin film of flour on the inner wall. Also fed into the chamber is the dough-forming solution which is projected centrifugally against the thin film of flour to form on the inner wall a pasty film that is directed downwardly along a helical path. The pasty film is scraped from the inner wall to produce a downwardly-extending ribbon that is then subjected to a kneading and developing action.

The flour fed into the mixing chamber is introduced therein through a hopper having an outlet of fixed dimensions. The practical difficulty with this fixed feed arrangement is that it fails to take into account the changing flowability of flour with variations in ambient temperature and humidity. Also, it does not accommodate the feed to the disparate characteristics of various flours. One, therefore, is not always able to attain optimum flour flow conditions.

Flour, which is a finely ground meal of wheat, is the backbone and structure of baked good, flour acting both as a binding and absorbing agent. Wheat is the only cereal that contains the proper combination of glutenin and gliadin for bread-making. When combined with water, these constituents form gluten which is essential for retaining the gas produced by yeast. The form of wheat used depends on the ultimate product. Thus there are several kinds of so-called hard wheat, the choice depending on the final product (i.e., rolls or bread). Cakes and cookies are derived from various types of soft wheat. In some instances, rye flour milled from rye grain may be blended into wheat flour.

In my above-identified copending application of which the present application is a continuation-in-part, means are provided in an apparatus generally of the type disclosed in my prior patent, to adjust the input feed of flour thereto to accommodate the machine to changing ambient conditions and to different flour characteristics. The arrangement is such as to effect continuous mixing of flour and a dough-forming solution, the solution being produced continuously at a rate in accordance with the demand therefor.

In the apparatus disclosed in my copending application, rotating within a lined cylindrical chamber is a screw, the chamber having a film-forming zone therein in which incoming flour particles are hurled by the screw against the surface of the liner to form thereon a thin, downwardly moving flour film. In the succeeding atomizing zone, the film or flour is admixed with the dough-forming solution to produce a pasty mass in film form. In the next zone, this pasty mass is then subjected to a kneading action to effect development, the developed mass then entering proofing and dough-dividing stages.

In the apparatus disclosed in my copending application, the development zone is integrated with the preceding atomizing and mixing zones, for the screw is common thereto. Hence if one adjusts the speed of screw rotation to optimize the activity being carried out in the paste-forming zone, this adjustment may at the same time adversely affect the development action in the succeeding zone. Thus for a given adjustment, the degree of development may be inadequate, causing the dough to lack homogeneous qualities; or it may be excessive, causing the dough to take on undesirable rubber-like characteristics.

SUMMARY OF INVENTION

In view of the foregoing, the main object of this invention is to provide a multi-stage system for automatically producing dough of high quality at a rapid rate, the stages of the system being separately controllable so that the activity carried out in each stage can be optimized independently of the others.

More particularly, an object of this invention is to provide a system of the above type whose mixing stage effects high-speed continuous mixing of flour and a dough-forming solution at a controllable rate in accordance with the demand therefor, the paste yielded by the mixing stage being supplied to a separately controllable development stage.

Still another object of the invention is to provide a development stage whose output section includes means to modify the temperature of the dough discharged therefrom prior to proofing.

Also an object of this invention is to provide a system which is highly compact and entails far less installation space and operating energy than prior art systems.

Briefly stated, these objects are attained in an automatic dough-producing system including a controllable mixing stage into which are fed flour and adough-forming solution to produce a paste which is then supplied to a development stage yielding dough.

In the development stage, the incoming paste is fed through a lateral inlet to a screw rotating within an elongated tube at a variable speed, the inlet position being adjustable along the screw to vary the length of that portion of the screw which acts to knead and develop the paste to produce the dough, this adjustment being independent of the mixing stage.

OUTLINE OF DRAWINGS

For a better understanding of the invention as well as other objects and further features thereof, reference is made to the following detailed description to be read in conjunction with the accompanying drawings wherein:

FIG. 1 schematically shows a first preferred embodiment of a system in accordance with the invention for producing dough derived from flour and dough-forming solution sources;

FIG. 2 shows the details of one of the ingredient sources for the solution;

FIG. 3 schematically shows a second embodiment of the system;

FIG. 4 shows a third embodiment of the system;

FIG. 5 shows a fourth embodiment of the system; and

FIG. 6 is a transverse section taken in the plane indicated by line 6—6 in FIG. 5.

DESCRIPTION OF INVENTION

First Embodiment

Referring now to FIG. 1, there is shown a multi-stage system in accordance with the invention for mixing flour with a dough-forming solution and for processing the mixture to produce high quality dough for baking.

The system includes a vertically-mounted mixing stage MSt in the form of a cylindrical casing 10 having an inner liner 11 therein to define a processing chamber, the upper end of the casing being joined to and communicating with a metering tube 12 of enlarged diameter. Tube 12 is integral with the cylindrical mouth of a conical main hopper 13. With the exception of the liner, this stage is preferably fabricated of stainless steel or other high strength material that is non-reactive with the ingredients being processed. Liner 11 is preferably fabricated of a low-friction, non-reactive material such as Teflon (PTFE).

Coaxially disposed within main hopper 13 is a rotatable shaft 14 whose upper portion extends thereabove, the shaft being supported by a suitable bearing 15. The shaft is driven by a variable speed motor 17 at a high speed through a belt 16 coupled to a pulley 17' keyed to the motor shaft.

Shaft 14 drives a main screw section 18 of uniform diameter which has a single-helix thread and is disposed within cylinder 10. Above main screw section 18 is a threaded feeder section 19 which has a conical formation, the feeder section lying within metering tube 12. While feeder section 19 is shown as being threaded, such threading functions only to agitate the flow of flour to prevent agglomeration thereof.

Slidable within metering tube 12 and surrounding feeder section 19 to define an annular valve orifice is a ring 20 whose inlet has a conical formation leading to the orifice. The axial position of ring 20 is settable by means of an adjusting element 21 which may take the form of a lead screw received in a threaded bore adjacent the periphery of the ring. The knob or head 21A of the adjusting element is outside of an below the metering tube, so that the axial position of the ring may be manually set to provide a valve orifice of the desired size.

Shaft 14 is provided with a longitudinally-extending central channel 22 which runs from the upper end of the shaft to one or more radial nozzles 23 bored into the main screw section 18 at a position lying below the junction of feeder screw section 19 and main screw section 18. In practice, the surface of this section should be of low-friction material such as PTFE, and the section may be of multi-helix design.

Flour from a supply hopper 24 is fed into main hopper 13 through a feeder screw 25 driven by a variable speed motor 26. Supply hopper 24 is provided with a flour level sensor 27 which applies its signal to an electronic control circuit 28 that governs motor 26 to maintain a desired level of flour in hopper 24. Main hopper 13 is physically vibrated by a powered vibrator 29 to prevent flour from agglomerating and clogging the hopper.

Thus the level of flow in main hopper 13 is maintained as flour is fed into the chamber of cylinder 10 at a rate controlled by the adjusted size of the valve orifice in metering tube 12, the dough-forming solution being concurrently supplied into the chamber.

The dough-forming solution fed into channel 22 is continuously prepared. By way of example, the ingredients of this solution include a yeast source X, a sugar source Y, and a salt source Z, whose outputs are fed through respective valves $V_x$, $V_y$ and $V_z$ into a mixing pump 30. The output of pump 30 is supplied by way of a buffer tank 31 into shaft channel 22 via solenoid controlled valve 32. Buffer tank 31 has a head of pressurized air above the solution therein, the tank serving to stabilize the solution and, in effect, to filter out pulsations produced by mixing pump 30.

As shown in FIG. 2, yeast source X consists of a level-controlled yeast supply hopper 33 whose output is fed by motorized feed screw 34 into a tank 35 to which water is also supplied, the yeast solution being agitated by a rotating blade 36. The yeast solution goes to mixing pump 30 through a main regulating valve 37. In sugar source Y as well as in salt source Z, these ingredients are mixed with water in a manner similar to that shown for the yeast.

The supply of ingredients fed into mixing pump 30 is coordinated with the demand therefor by the dough-processing system so that the dough-forming solution is continuously generated at an appropriate rate, and there is effectively no dwell period during which the solution is held awaiting use in the dough-processing apparatus.

In operation, flour entering the uppermost flight of main screw 18 in the chamber of cylinder 10 is directed downwardly into a film-forming zone A. Because of the high speed of the screw, the particles of flour are centrifugally hurled outwardly against the surface of inner liner 11 to form thereon a thin, downwardly-moving flour film. Any flour particles coming in contact with the trough surfaces of the flights of main screw 18 will instantly be thrown outwardly at high speed to bombard and admix with the flour film.

Nozzles 23 which eject the dough-forming solution are located in a flight of main screw 18 just below film-forming zone Z within an atomizing zone B. The solution is projected from nozzles 23 centrifugally against the flour film emerging from film-forming zone A to become atomized and admixed therewith in atomizing zone B to produce a pasty, homogenized mass in film form. This pasty film is advanced by the screw down the chamber and is discharged at the lower end of cylinder 10.

The development stage DSt of the system includes a screw 38 which rotates within an elongated tube 39, preferably fabricated of stainless steel and provided with an inner liner similar to that of cylinder 10 in the mixing stage. The upper end of tube 39 is concentrically surrounded by a cylindrical housing 40 whose closed annular ends are joined to tube 39. Tube 39 has a gap 39E lying within the housing to define a lateral inlet into development stage DSt.

Screw 38 is driven by a variable speed motor 41 through a belt 42, the screw shaft being supported by a bearing 43. The lower end of screw 38 is provided with an extruder section 38A which acts to pump the developed dough into an outlet section 39A of reduced diameter. Joined to housing 40 is an L-shaped coupling pipe 44 or elbow whose vertical leg 44L telescopes over the outlet of cylinder 10 of mixing stage MSt, the horizontal leg of the pipe communicating with the interior of housing 40.

Thus, paste discharged by mixing stage MSt is fed by elbow 44 to the housing 40 of the development stage DSt, the paste entering the screw chamber therein through tube inlet 39E.

Housing 40 is provided at one side with a toothed plate 45 which meshes with the teeth of a lead screw 46 such that when the lead screw is turned by an operator in one direction, then housing tube 39 and coupler 44, all of which are joined together into a unitary sub-assembly, move upwardly with respect to screw 38. When the lead screw is turned in the reverse direction, the sub-assembly moves downwardly.

This up or down displacement of the sub-assembly causes inlet 39E to travel longitudinally along the screw 38 in the same direction. Since the incoming paste is forced by that portion of screw 38 which lies below inlet 39E downwardly toward outlet section 39A of the tube, the higher the inlet position along the screw, the greater the length of the operative portion of screw 38. When, therefore, the inlet position is shifted in the down direction relative to screw 38, this reduces the length of the operative portion of the screw.

The operative portion of screw 38 acts to knead and thereby develop the paste to produce a dough which is forced through outlet section 39A and discharged through an extruding die 47. Since the rotary speed of screw 38 is adjustable, and the length of the operative portion of the screw is also adjustable, one can thereby set the degree of kneading and development to produce dough of the desired quality.

The dough discharged from the development stage is then fed into a proofing stage (not shown) which may be of the type disclosed in my copending application, and from there into a dough-divider stage from which the resultant dough balls are delivered to an oven.

In the system shown in FIG. 1, the dough emerging from the outlet of the development stage and fed into the proofing chamber must be at the optimum proofing temperature; for a temperature that is too low will render the yeast dormant, and one that is excessive may kill the yeast. In order, therefore, to feed the dough into a proofing chamber at the optimum proofing temperature, the incoming water in the dough-forming solution is heated to a level which takes into account the exothermic reaction of the yeast and the friction produced by the rotating mixing mechanism.

In order to heat or cool the dough emerging from outlet 39A, the outlet is surrounded by a jacket 48, the outlet of the sub-assembly being slidable with respect to the jacket. If one wishes to heat the dough, heated fluid is conducted through the jacket, cooling being effected by a cold fluid. Cooling is used when the dough is not to be immediately baked but is to be stored in the frozen state for subsequent proofing.

Second Embodiment

In the system shown in FIG. 3, the mixer stage MSt is the same as in FIG. 1. But in this instance, the screw 49 of the developing state DSt is horizontally supported at one end by a bearing 50 and driven though belt 51 by a variable speed motor 52.

Screw 49 rotates within an elongated tube 53 having a closed end, the tube being provided with an inlet gap 53E. Concentrically surrounding tube 53 is a cylindrical inlet housing 54 which encircles gap 53E and directly communicates with the outlet of cylinder 10 of the mixing stage. Thus the paste from stage MSt is supplied into housing 54 and enters the developing stage through inlet gap 53E.

Tube 53 is also provided with an outlet gap 53-0 which is surrounded by an outlet housing 55. Outlet housing 55 communicates with an extruder constituted by an extruder screw 56 driven by a variable speed motor 57, the outlet pipe of the extruder being surrounded by a jacket 58 for cooling or heating the dough before it is discharged.

Tube 53 is provided adjacent its closed end with a toothed plate 59 which is engaged by a crank-operated lead screw 59*s*. This makes it possible to axially displace tube 53 relative to fixed housings 54 and 55, and thereby shift the position of inlet gap 53E with respect to dough development screw 49 to adjust the effective operative length of this screw in the same manner as in FIG. 1.

Third Embodiment

In the first and second embodiments of the multi-stage dough-producing system, the rotating screw in the development stage occupies a fixed position, and the tube within which the screw rotates is axially shiftable to adjust the position of the inlet gap with respect to the screw. In this way, one is able to control the degree of development.

In the third embodiment of the invention as shown in FIG. 4, the elongated tube 60 within which the development screw 69 rotates, is fixed in position. Surrounding the upper end of tube 60 is an input housing 61 having an annular inlet 61E leading into the screw, the housing being supplied with paste from a mixing stage (not shown). Surrounding tube 60 adjacent its outlet end is a thermal jacket 62 through which a heating or cooling fluid is conducted to heat or cool the developed dough before it is extruded from the tube by an extruder screw 63.

Extruder screw 63 is secured to the end of a shaft 64 coaxially disposed within tube 60, the shaft being supported by a bearing 65 and being driven through variable speed pulleys 66 and a continuous belt 67 by a motor 68.

Development screw 69 is keyed to shaft 64 by a pair of keys 70a and 70b projecting from opposing sides of the shaft. These keys are received within corresponding keyways cut into screw 69 so that its axial position is shiftable with respect to the shaft. The upper end of development screw 69 is secured to a ball bearing 71 having a toothed plate 72 laterally attached thereto. Plate 72 meshes with a lead screw 73 whose stem is supported in a bearing 74 attached to one side of input housing 61, the stem being manually turnable by means of a dial 75.

Thus by turning dial 75 in one direction, one can axially slide development screw 69 upwardly with respect to fixed tube 60, so that inlet 61E then operates with a relatively short effective portion of screw 69 to reduce the development period. To lengthen the development period, dial 75 is turned in the reverse direction to cause the development screw to move downwardly, thereby relating paste inlet 61E to a longer portion of the development screw.

In all other respects, the operation of this embodiment is essentially the same as in the previous arrangements, the development stage and the mixing stages being independently controllable to optimize the processing of dough.

Fourth Embodiment

Even though the mixing and development stages are separately and independently controllable, one may have a development stage whose maximum development capacity is such that a single mixing stage of the type shown in the previous embodiments is incapable of supplying sufficient paste to exploit the full capacity of the development stage.

While it is possible to enlarge the capacity of the mixing stage in the system by means of a mixing screw of greater diameter, as a practical matter, diameters above a certain size create mechanical problems; and it is best, therefore, to use a pair of like mixing stages in tandem, each having a screw of acceptable diameter.

Thus, as shown in FIGS. 5 and 6, the system in this embodiment includes a pair of like mixing stages $MSt_1$ and $MSt_2$, each being generally of the type shown in FIG. 1. Each stage includes a mixing screw 18 driven by a shaft 14 having a central channel 22 therein leading to nozzles 23, the channel supplying a dough-forming solution thereto taken from a suitable source.

In this development stage DSt, instead of having a cylindrical input housing as in FIG. 4, there is provided adjacent the upper end of tube 60, a toroidal inlet structure 76 which is coupled on one side through a valve 77 to a duct 78 connected to the outlet of mixing stage $MSt_1$. The other side of toroidal inlet structure 76 is similarly coupled to the outlet of mixing stage $MSt_2$ through a valve 77 and a duct 80.

The respective shafts 14 of the two mixing stages are supported in separate bearings 15 and are linked to a common motor 81 through variable speed pulleys 82. A common flour bin 83 is provided for both mixing stages, the bin supplying the flour into the respective hoppers 13 of these stages. The flow of flour in each stage is controllable by manual adjustment of ring 20 as in FIG. 1.

Thus the two mixing stages which are separately controllable operate in tandem, their combined paste outputs being fed into development stage DSt which is controllable independently of the mixing stages.

While there have been shown and described preferred embodiments of a multi-stage automatic dough-producing system in accordance with the invention, it will be appreciated that many changes and modifications may be made therein without, however, departing from the essential spirit thereof. Thus in the development stage, in order to vary the length of the operative portion of the screw, in the arrangement shown, the housing having the inlet gap is axially shifted relative to the rotating screw, the same result may be accomplished by axially shifting the rotating screw relative to the housing. And while in the mixing stage, the dough-forming solution is conducted through the screw and then ejected therefrom to be hurled centrifugally against the flour film, this solution may instead be introduced into the cylindrical chamber so as to flow down the lined interior wall and be intermixed by the rotating screw with the layer of flour advancing down this wall. As pointed out previously, flour hydration occurs very rapidly and a centrifugal projection of the liquid is not essential for this purpose.

I claim:

1. A multi-stage system for automatically and continuously producing dough from a source of flour and a source of dough-forming solution that includes yeast, said system comprising:

A. a mixing stage coupled to said sources and including a first screw provided with a nozzle and operating within a cylindrical chamber having an outlet at an adjustable rate to intermix said flour and said solution to form a paste which is discharged from its outlet, said first screw having an axial bore therein into which said solution is fed, said bore communicating with said nozzle in the first screw whereby the solution is projected therefrom against a film of flour formed on the inner surface of the chamber by the first screw;

B. a development stage including a second screw independent of a first screw, said second screw having an input end and an output end, said second screw being driven at said input end at an adjustable rate by a variable speed motor, said second screw rotating within a tube having an inlet gap therein surrounded by a housing which communicates with the outlet of the mixing stage, whereby the paste therefrom is supplied to the development stage laterally through the inlet gap, and means to displace the longitudinal position of the gap relative to the second screw, so that it moves toward or away from said input end, whereby the portion of the second screw between the inlet gap and the output end of the second screw represents the operative portion thereof which acts to knead and develop the incoming paste to retain the gases generated by the yeast to produce dough, the length of the operative portion being adjustable to effect the desired degree of development appropriate to the paste derived from said sources.

2. A system as set forth in claim 1, wherein said housing is attached to said tube which is displaceable relative to the second screw to shift the position of the inlet gap.

3. A system as set forth in claim 2, wherein said tube has an outlet section which is slidable within a thermal jacket through which a fluid is conducted to modify the temperature of the dough passing through the outlet of the tube.

4. A system as set forth in claim 2, wherein said mixing stage has a tubular output and said housing is provided with a coupling pipe having a leg which telescopes over said tubular output and is shifted relative to said output when said housing is displaced.

5. A system as set forth in claim 2, wherein said housing is provided at one side with a toothed plate which meshes with a lead screw such that when said lead screw is turned, said housing is displaced.

6. A system as set forth in claim 1, wherein said means to displace the longitudinal position of the gap is constituted by means to axially displace the tube relative to said second screw.

7. A system as set forth in claim 6, wherein said tube further includes an outlet gap surrounded by a second housing whereby the dough formed in said tube is discharged through said outlet gap into said second housing.

8. A system as set forth in claim 7, further including an extruder coupled to said second housing to force the dough from said second housing through an extrusion die.

9. A system as set forth in claim 1, wherein said means to displace the longitudinal portion of the gap relative to the second screw includes means to axially shift the position of the screw.

10. A system as set forth in claim 9, wherein said second screw is mounted on a driven shaft, said shaft being provided with keys which lie within keyways cut into the second screw whereby the screw is slidable relative to the shaft.

11. A system as set forth in claim 1, further including a second mixing stage operating in tandem with said mixing stage, the paste from both mixing stages being supplied into the inlet gap of the development stage.

12. A system as set forth in claim 11, wherein said flour source is a bin common to both mixing stages.

13. A system as set forth in claim 11, wherein said inlet gap to said development stage is defined by a toroidal inlet structure surrounding the upper end of the tube, said structure being coupled through separate ducts to the mixing stages.

* * * * *